United States Patent Office 3,014,903
Patented Dec. 26, 1961

3,014,903
NEW 18-OXYGENATED STEROIDS
Tadeus Reichstein, Weissensteinstrasse 22, Albert Wettstein, Georg Anner, Jean-Rene Billeter and Karl Heusler, Basel, Robert Neher, Binningen, Julius Schmidlin, Basel, Hellmut Ueberwasser, Riehen, and Peter Wieland, Basel, all of Switzerland, assignors to said Tadeus Reichstein, Basel, Switzerland
No Drawing. Filed Oct. 28, 1958, Ser. No. 769,996
Claims priority, application Switzerland Nov. 6, 1957
16 Claims. (Cl. 260—239.55)

This is a continuation in part application to application Serial No. 585,144, filed May 16, 1956 (now abandoned) which is in turn a continuation in part application to application Serial No. 480,062, filed January 5, 1955 (now abandoned).

The highly active hormone of the suprarenal gland which is responsible for the regulation of the mineral metabolism in the human body is known to be a pregnene compound of the following formulae which obviously represent an equilibrium

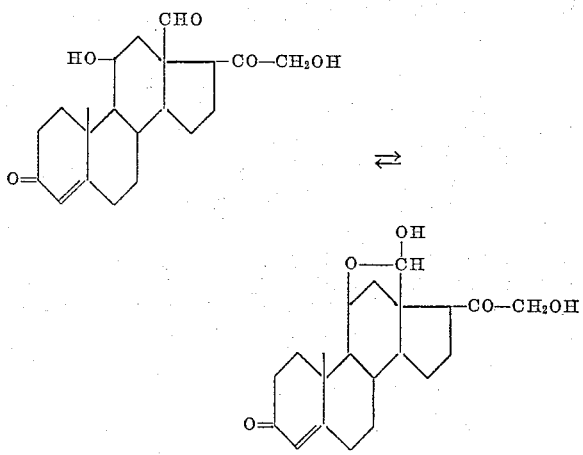

Since this important hormone has so far been available only by a tedious extractive procedure from suprarenal glands of animals and could only be obtained in very low yield (40 to 95 mg. from 1000 kilos of fresh beef adrenals), a synthesis of this hormone and closely 18-oxygenated hormones (e.g. the 18-hydroxy compound corresponding to aldosterone, viz. $\Delta^4$-3,20-dioxo-11$\beta$:18:21-trihydroxy-pregnene, that is 18-hydroxy-corticosterone which shows a similar high physiological activity) from readily available compounds either from other naturally occurring steroids or a total synthesis is of extraordinary technical importance.

The present invention thus provides a series of intermediates which can readily be converted into aldosterone or into the 18-hydroxy-corticosterone, thus making these hormones available in sufficient quantity.

The invention more specifically relates to 16,17-saturated or 16,17-unsaturated steroid compounds of the formula

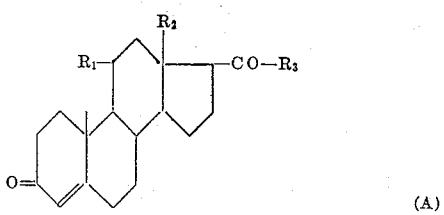

and derivatives thereof, such as esters, ethers and ketals, in which formula $R_1$ is a hydroxyl- or oxo group, $R_2$ a hydroxymethyl group, an aldehyde- or a carboxyl group and $R_3$ is a methyl- or hydroxymethyl group or a hydrogen atom.

All the above mentioned compounds are convertible by the methods indicated below into $\Delta^4$-3,20-dioxo-21-hydroxy-pregnenes of the formula

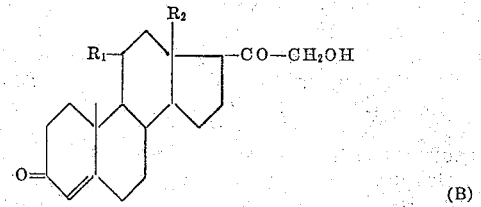

or derivatives thereof, such as esters, ketals and ethers, in which formula $R_1$ and $R_2$ have the same meaning as in Formula A.

If $R_1$ represents a hydroxy group and $R_2$ an aldehyde group or a hydroxymethyl group the above Formula B is identical with that of aldosterone or 18-hydroxy-corticosterone, respectively. If however $R_1$ and/or $R_2$ are different, they are converted into a hydroxy group and an aldehyde group or hydroxymethyl group, respectively, as follows:

If $R_1$ is an oxo group, the compound of the above Formula B is treated in an inert solvent, such as benzene or a halogenated hydrocarbon, such as dichloroethylene, with a ketalizing agent, such as ethylene glycol, trimethylene glycol, mercaptoethanol, dithioglycol, in the presence of an acidic catalyst, whereby all the oxo groups present in the molecule are converted into ketals except for the 11-oxo group, which then can be reduced by treatment with a complex metal hydride, such as sodium or lithium borohydride or lithium aluminum hydride, in the conventional manner.

The conversion of $R_2$ into an aldehyde- or hydroxymethyl group in the compounds of the above Formula B wherein $R_1$ represents an oxy group is performed in the following way:

The conversion of an (18→11)-lactone of an 11$\beta$-hydroxy-18-acid into the hydroxy aldehyde or the hydroxyhydroxymethyl compound is described in detail in application Serial No. 770,006, filed October 28, 1958 and is effected by reduction with a limited amount of a complex metal hydride, such as lithium aluminum hydride, after protection of the free oxo groups in the 3- and 20-positions by ketalization as described above.

The conversion of a substituent $R_3$ different from a hydroxymethyl group in the above Formula A into a methyl group may be effected in the following way:

If $R_3$ is a hydrogen atom, the 17-aldehyde group is oxidized according to known methods, for instance with the aid of chromic acid, or more easily with potassium permanganate in alkaline solution, especially in pyridine solution, to a carboxylic acid group and this group is then transformed into the oxyacetyl group according to the method of our copending application Serial No. 480,061, filed January 5, 1955, now Patent No. 2,904,545 for example by converting the 17-carboxylic acid into an acid halide, such as the carboxylic acid chloride by the reaction with oxalyl chloride in benzene solution, reacting the acid chloride with diazomethane and decomposing the diazoketone obtained with glacial acetic acid at about 100° C., whereby the 21-acetoxy compounds is formed which may be hydrolized with sodium bicarbonate in an aqueous methanolic solution.

If $R_3$ is a methyl group it can be converted into an oxyacetyl group by the method described in application Serial No. 770,015 filed October 28, 1958, which method consists in reacting the 21-desoxy-compounds preferably after protection of the keto group in 3-position by ketalization and protection of the functional group in 13-position by esterification or etherification, with an oxalic acid ester, for example with dimethyl oxalate in the presence of about 1.5 molar equivalents of dry sodium methoxide in benzene solution at room temperature, treating the 21-oxalo acid ester in the form of its enol salt, e.g. its sodium salt in methanolic solution with a halogen, such as iodine, subjecting to acid cleavage the 21-halogen-21-oxalo acid ester formed by treatment with about 1 molar equivalent of sodium methoxide in methanol at 0° C. for several hours and converting the 21-halides into 21-esters by reaction with a carboxylic acid salt, e.g. with potassium acetate in acetone solution; finally ester-, ether- and ketal groupings are hydrolized in known manner.

The derivatives of the compounds of the Formula A given above may be esters, thioesters, enolesters, ethers, enolethers, thioethers, acetals, ketals, mercaptals, lactones, cyclosemiacetals, thiol- and thionesters, enamines, hydrazones, semicarbazones and the like. An aldehyde- or carboxyl group in 13-position can be acetalized or lactonized with a hydroxyl group in the 11-position. The compounds can be racemic or optically active.

The process for the preparation of the compounds of this invention consists in hydrogenating the semicyclic double bond in compounds of the formula

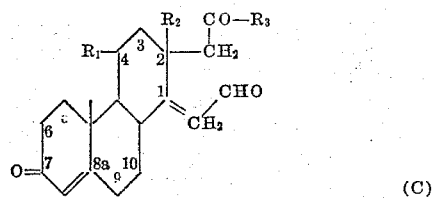

or in corresponding 3-ketals, in which formula $R_1$, $R_2$ and $R_3$ have the meaning given in Formula A, and condensing intramolecularly the resulting compounds of the formula

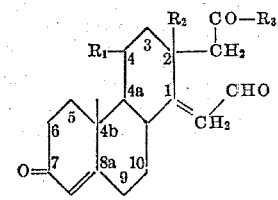

by reacting the aldehyde group in 1β-position with the methylene group at carbon atom 2 and, if desired, saturating in resulting steroids a double bond in 16:17-position with hydrogen and/or liberating functionally converted hydroxyl-, oxo- or carboxyl groups.

For the saturation of the semicyclic double bond in the starting materials of the present process various methods of reduction can be used. There may be mentioned the catalytic hydrogenation in the presence of a palladium or nickel catalyst, or the action of nascent hydrogen produced, for example, by means of sodium amalgam in an aqueous solvent, such as moist ether, or by means of an alkali metal, such as sodium potassium or lithium, in the presence of liquid ammonia or a lower aliphatic amine. Finally, the selective reduction of the semicyclic double bond may be carried out by an indirect method, for example, by additive combination at the double bond of a thio-compound, for example, benzyl mercaptan or thioglycolic acid, followed by the reductive elimination of the additively combined sulfur-containing substituent, for example, by means of Raney nickel.

The intramolecular condensation is advantageously carried out under mild conditions, for example, merely by heating, even in aqueous solution, but there can also be employed condensing agents, such as strong alkalis, such as alkali metal alcoholates or amides, triethylamine or piperidine or quaternary ammonium bases, such as Triton B, if desired, also in the presence of an organic acid, for example acetic or benzoic acid.

When there is used as starting material a compound of the Formula C, in which $R_2$ represents an aldehyde group, the latter is advantageously protected before the condensation is carried out. This can be accomplished surprisingly simply as the aldehyde very easily forms a lactol (cyclo-semiaectal) with a hydroxyl group in the 4-position. The lactol may be reacted with an active halide, for example a benzyl halide, or with dihydropyrane, to form the acetal. It is also possible to acylate the lactol formed. Thus, for example, the lactol acetate can be obtained under mild conditions with acetic acid anhydride and pyridine. The acetals may also be split up again with an aqueous acid. In the case of the benzyl ether of the lactol the splitting can be carried out by treatment with hydrogen in the presence of a catalyst such as palladium on charcoal.

The starting materials of the process described in this application may be prepared according to application Serial No. 585,143, filed May 16, 1956, now Pat. No. 2,986,567 as illustrated by way of example for the case of (2→4)-lactones in the following diagram of formulae:

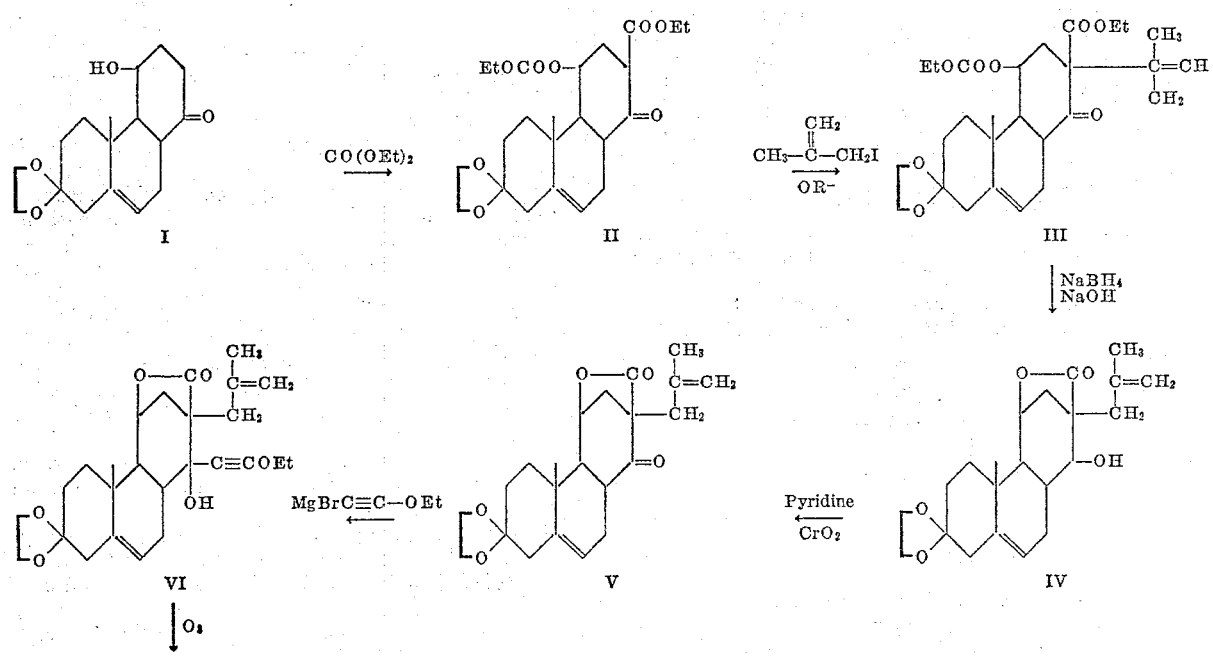

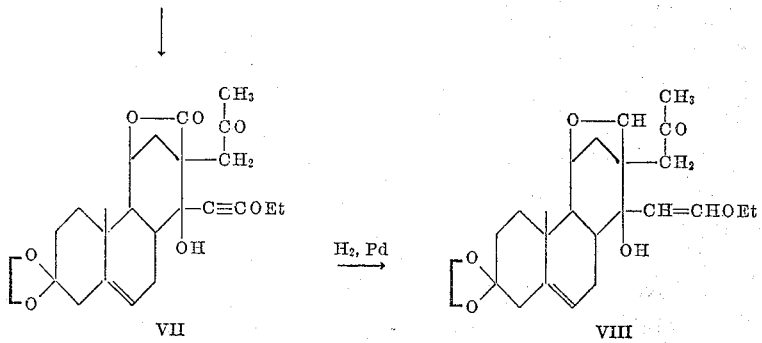

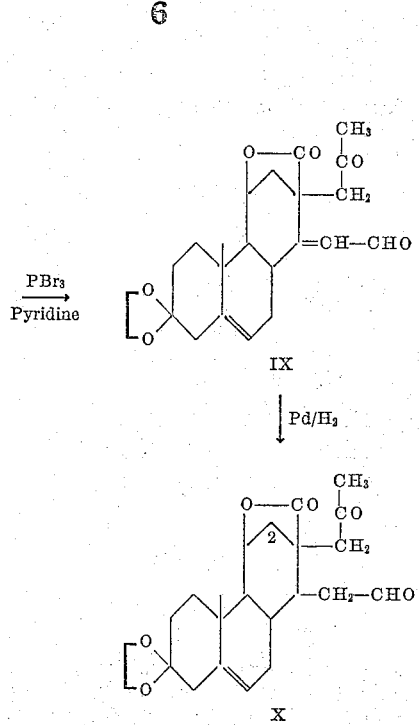

The compound corresponding to X, but having an acetoxy-acetonyl side chain in the 2-position instead of an acetonyl side chain is prepared from compound XI which is obtained from I in complete analogy to the preparation of VI using allyl iodide in the second step (II→III). By the following reaction, XI, is converted to XII which by analogy to the transformation VII→X gives the desired acetoxy-derivative.

the invention, be easily saturated with hydrogen, for example with a palladium catalyst in alcoholic solution.

Racemates obtained can be split into their antipodes by known methods at any suitable stage of the process.

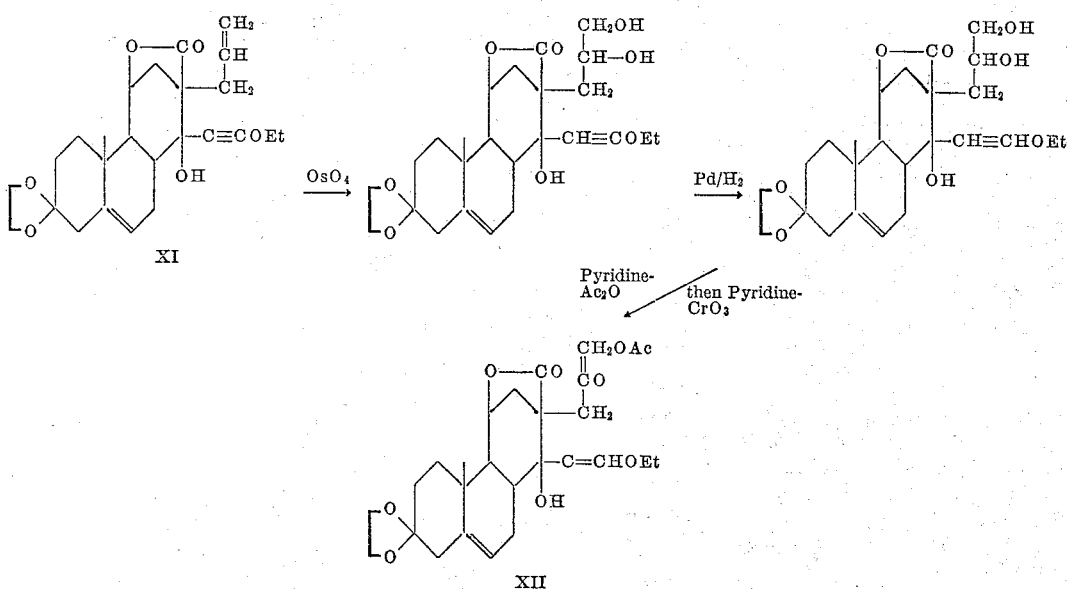

A sequence of reaction steps for the preparation of the starting materials similar to the above described, but in another order of succession, is illustrated by the examples below.

The products obtained by the condensation of the present process are 16:17-unsaturated steroids which have in 17-position an aldehyde- or an acetyl- or free or esterified hydroxyacetyl group. The 16:17-double bond conjugated with a carbonyl group can, according to the process of It has been found that when the 18-oxygenated pregnane compounds of the formula

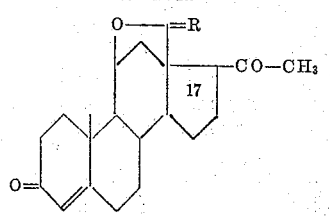

with a β-orientated side chain at position 17, in which R represents an oxo group or a hydrogen atom and a free, esterified or etherified hydroxyl group or their derivatives unsaturated in the nucleus are treated with alkalies there are formed larger or smaller quantities of products which are isomeric with regard to the above compounds with regard to the pregnane side chain i.e. their side chain is in the 17α-orientation. If such an isomeric compound is subjected to the same reaction as described above for the 17β-compounds the final product obtained will be 17-iso-aldosterone, that is a compound isomeric to aldosterone having the pregnane side chain in 17α-orientation or its derivatives. The present invention also provides a process which enables these hitherto unusable 17α-isomers to be converted into products suitable for the synthesis of aldosterone, or, if desired, into aldosterone itself. Such process consists in taking a compound of the formula

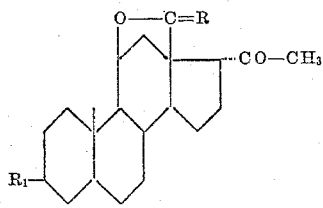

in which R represents an oxo group or a hydrogen atom and a free, esterified or etherified hydroxyl group, and $R_1$ represents a free or ketalized oxo group, and which may also contain a double bond starting from the 5-carbon atom, treating it with an alkaline agent and separating the resulting compound having a 17β-side chain.

Various basic agents are suitable for the isomerization, for example, alkali metal bicarbonate, carbonates or hydroxides, or alkali metal alcoholates, for example, sodium methylate or ethylate, potassium tertiary butylate or amylate, aluminum oxide and also strong organic bases such as pyrrolidine, piperidine, trimethyl-benzyl ammonium hydroxide or alkoxides. With the use of strong bases such as alkali metal hydroxides or alcoholates the isomerization takes place even at temperatures up to 20° C., while in the case of weaker bases, for example organic bases or alkali metal bicarbonates, a higher temperature is necessary to produce a more rapid reaction. The process may be carried out in an aqueous medium or, especially in the case of organic bases, in an anhydrous medium, for example, in a lower alcohol, such as methanol, ethanol or the like, or in dioxane or tetrahydrofurane or mixtures thereof. When organic bases are used hydrocarbons are also suitable such as benzene, toluene or xylene. The reaction leads to an equilibrium mixture of the two isomers, from which the desired 17β-compound can be obtained in the usual manner, for example, by chromatography on suitable absorbents, for example, silica gel, or by distribution on paper or cellulose. The rearrangement of this invention can be carired out in an especially simple manner and in a high yield by separating the 17β-compound from the starting material due to its lower solubility or higher speed of crystallization by inoculation direct from the equilibrium mixture.

By the alkaline treatment, especially in an aqueous medium, any ester groups present can be hydrolysed simultaneously with the isomerization.

The invention also includes the 18-oxygenated 17-iso-compounds used as starting materials in the aforesaid process, and especially (18→11)-lactone of $\Delta^4$-3:20-dioxo-11β-hydroxy-17-iso-pregnene-18-acid and also the 3-ketals derived from this compound.

The starting materials are formed by the alkaline treatment of the corresponding 17β-compounds, which latter are obtained as described in this application. They are racemates or the corresponding enantiomeric forms.

The following examples illustrate the invention, the parts being by weight unless otherwise stated, and the relationship of parts by weight to parts by volume being the same as that of the gram to the cubic centimeter.

*Example 1*

4.006 parts of the (2→4β)-lactone of $\Delta^{8a}$-1:1-formyl-methylene-2α-acetonyl-2β-carboxy-4bβ-methyl - 7 - ethylenedioxy - 1:2:3:4:4aα:4b:5:6:7:8:10:10aβ - dodecahydrophenanthrene-4β-ol whose preparation is described in detail in our copending application Serial No. 585,143, filed May 16, 1956, in finely pulverized form in 800 parts by volume of ethanol of 95 percent strength is agitated in the presence of 2.00 parts of a 10 percent palladium-calcium carbonate catalyst with hydrogen under atmospheric pressure. The starting material dissolves gradually, and, after the absorption of one molar equivalent of gas, the hydrogenation practically ceases. The whole is then filtered through a layer of Supercel to remove the catalyst, and the clear filtrate is evaporated in vacuo to a small volume. The (2→4β)-lactone of $\Delta^{8a}$-1β-formyl-methyl-2α-acetonyl-2β-carboxy-4bβ - methyl-7-ethylenedioxy-1:2:3:4aα:4b:5:6:7:8:10:10aβ - dodecahydrophenanthrene-4β-ol crystallizes in colorless crystals melting at 193–204.5° C. (with partial decomposition). The compound reduces alkaline silver diamine solution rapidly and strongly.

A solution of 21.10 parts of the (2→4β)-lactone of 1β-formyl - methyl - 2α-acetonyl-2β-carboxy-4bβ-methyl-7-ethylene - dioxy - 1:2:3:4:4aα-4b:5:6:7:8:10:10aβ-dodecahydrophenanthrene-4β-ol and 1.67 parts of Triton B in 4.5 parts by volume of tertiary butanol in 500 parts by volume of benzene is subjected to slow distillation in an atmosphere of nitrogen for 4 hours. After cooling, the solution is diluted with ether and agitated successively with a 2-molar solution of sodium dihydrogen phosphate, water, 1 N-sodium carbonate solution and water, dried with sodium sulfate and evaporated in vacuo. For the purpose of purification the residue is dissolved in benzene and chromatographed over neutral aluminum oxide according to the fractional elution method. As elutriating agents there are used benzene, mixtures of benzene and ether (9:1) and (1:1), ether and a mixture of ether and ethyl acetate (9:1). The eluates are tested chromatographically under the quartz lamp by means of spot tests on paper and the strongly absorbing fractions combined. By recrystallization from a mixture of acetone and ether, and ether and isopropyl ether there is obtained the pure (18→11β)-lactone of d:l-$\Delta^{5:16}$-3-ethylenedioxy-11β-hydroxy-20-oxo-pregnadiene-18-acid.

This compound can be converted into the (18→11β)-lactone of d:l-$\Delta^4$-3:20-dioxo-11β-hydroxy-pregnene-18-acid as follows:

A solution of 19.23 parts of (18→11β)-lactone of d:l-$\Delta^{5:16}$ - 3-ethylene-dioxy-11β-hydroxy-20-oxo-pregnadiene-18-acid in 500 parts by volume of ethanol is stirred in the presence of 10.0 parts of a palladium-strontium carbonate catalyst of 2 percent strength at room temperature in an atmosphere of hydrogen. After taking up 1.05 equivalents of gas the hydrogenation is practically finished. The whole is suction-filtered from the catalyst and the solvent is distilled under reduced pressure. For the purpose of purification, a solution of the residue in benzene is filtered through a layer of activated carbon and the filtrate evaporated in vacuo. From the residue there is obtained by recrystallisation from ether, using methylene chloride as solution promoter, the (18→11β)-lactone of d:l-$\Delta^5$-3-ethylene-dioxy-11β-hydroxy-20-oxo-pregnene-18-acid.

A solution of 19.33 parts of (18→11β)-lactone of d:l-$\Delta^5$ - 3 - ethylene-dioxy-11β-hydroxy-20-oxo-pregnene-18-acid and 4.3 parts of para-toluene sulfonic acid in 500 parts by volume of acetone is stirred for 48 hours at room temperature. The solution is then diluted with water and the acetone distilled off in vacuo. The reaction product is taken up in a mixture of ether and methylene chloride (3:1), the extract washed with 1 N-sodium bicarbonate solution and water, dried with sodium sulfate and evaporated in vacuo. By recrystallization from ether there is obtained the (18→11β)-lactone of d:l-Δ⁴-3:20-dioxo-11β-hydroxy-pregnene-18-acid.

The above described 3-ethylene-dioxy-derivative of this compound is converted into the (18→11β)-lactone of d:l - Δ⁴-3:20-dioxo-11β-hydroxy-21-acetoxy-pregnene-18-acid by the process described in our copending application Serial No. 770,015, filed October 28, 1958. The infrared spectrum taken in solution is identical with that of the optically active compound prepared from aldosterone.

If for the purpose of ring-closure the (2→4β)-lactone of 1β-formyl-methyl-2α(ω-acetoxy-acetonyl)-2β-carboxy-4bβ - methyl-7-ethylene-dioxy-1:2:3:4:4aα:4b:5:6:7:8:10:10aβ-dodecahydrophenanthrene-4β-ol is used as starting material, there is obtained after hydrogenation of the 16:17-double bond and ketal cleavage as described above the (18→11β)-lactone of d:l-Δ⁴-3:20-dioxo-11β-hydroxy-21-acetoxy-pregnene-18-acid which in solution also exhibits an infrared spectrum identical with the optically active compound prepared from aldosterone.

*Example 2*

A suspension of 4.005 parts by weight of the (2→4β)-lactone of d:l-Δ⁸ᵃ-1:1-(formyl-methylene)-2α-acetonyl-4β - hydroxy-4bβ-methyl-7:7-ethylenedioxy-4aα:10aβ-dodecahydro-phenanthrene-2β-carboxylic acid in 200 parts by volume of 95% ethanol is stirred in an atmosphere of hydrogen at room temperature in the presence of 1.05 parts by weight of a 10% palladium calcium carbonate catalyst. The hydrogenation ceases when one equivalent of gas has been taken up. The reaction mixture is then filtered through a layer of Supercel, the flask being rinsed with a total of 50 parts by volume of 95% ethanol. The solution is then concentrated to 5–10 parts by volume under reduced pressure while nitrogen is flowing in. After being allowed to stand for 2 hours at 0° C., the suspension is subjected to filtration. The crystals are washed with ice-cold ethanol of 95% strength and then dried at 25° C. in vacuo. The resulting (2→4β)-lactone of d:l-Δ⁸ᵃ - 1 - (formyl - methyl)-2α-acetonyl-4β-hydroxy-4bβ-methyl - 7:7-ethylenedioxy-4aα:10aβ-dodecahydrophenanthrene-2β-carboxylic acid of melting point 193–204.5° C. (with partial decomposition) is a mixture of the saturated aldehydes isomeric in position 1.

4.00 parts by weight of the (2→4β)-lactone of d:l-Δ⁸ᵃ-1-(formyl - methyl)-1α-acetonyl-4β-hydroxy - 4bβ-methyl-7:7-ethylenedioxy - 4aα:10aβ - dodecahydrophenanthrene-2β-carboxylic acid (isomeric mixture) and 4.28 parts by weight of benzoic acid are covered with 100 parts by volume of anhydrous xylene, and 3.5 parts by volume of triethylamine added before the mixture is heated for 15 hours to gentle boiling in an atmosphere of nitrogen. The solution is then cooled, diluted with 300 parts by volume of benzene and 100 parts by volume of ether, shaken at 0° C. in turn with 0.5 n-sodium carbonate solution, 1.5 n-phosphoric acid, 0.5 n-sodium bicarbonate solution, and water, dried with sodium sulfate and evaporated under a vacuum produced by an oil pump. The mixture of substances obtained by crystallization from ether with the use of methylene chloride as a solution promoter is dissolved in benzene and chromatographed on 212 parts by weight of silicagel by the fractional elution method. To remove weakly polar impurities, elutriation is first carried out with benzene and mixtures of benzene and ethyl acetate up to an ethyl acetate content of 7.5%. After this, the pure (18→11β)-lactone of d:l-Δ⁵·¹⁶ - ethylenedioxy-11β-hydroxy-20-oxo-pregnadiene-18-acid is dissolved out with a mixture of benzene and ethyl acetate (90:10); after recrystallization from ether with the use of methylene chloride as a solution promoter the compound melts at 245–247° C. On further elutriation there appears in the later fractions the pure (18→11β)-lactone of d:l-Δ⁵·¹⁶-3:3-ethylene-dioxy-11β-hydroxy-20-oxo-14-isopregnadiene-18-acid of melting point 244–246° C.

A suspension of 2.015 parts by weight of the (18→11β)-lactone of d:l-Δ⁵·¹⁶-3:3 - ethylenedioxy-11β-hydroxy-20-oxo-pregnadiene-18-acid of melting point 245–247° C. in 530 parts by volume of 95% ethanol is hydrogenated at room temperature with 5.03 parts by weight of a 2% palladium-calcium carbonate catalyst with hydrogen at atmospheric pressure. After the quantity of gas calculated for one mol equivalent has been taken up and the starting material has passed completely into solution, the reaction comes to a standstill. The catalyst is filtered off, the filtrate evaporated under vacuum and the crystalline residue dissolved in 75 parts by volume of benzene and the solution filtered through a column of 2.62 parts by weight of active charcoal prepared with benzene. The colorless benzene solution is finally evaporated under vacuum and the residue recrystallized from ether with the application of methylene chloride as solution promoter. In this manner the (18→11β)-lactone of d:l-Δ⁵-3:3-ethylenedioxy-11β-hydroxy-20-oxo-pregnene-18 - acid is obtained in colorless plates which melt at 195–210.5° C. (with conversion into prisms).

0.00846 part by weight of the (18→11β)-lactone of d:l-Δ⁵-3:3-ethylenedioxy-11β-hydroxy-20-keto-pregnene - 18-acid is dissolved in 1 part by volume of 96% acetic acid and the solution treated with 1 part by volume of distilled water. After the production of an oxygen-free nitrogen atmosphere in the reaction vessel, the solution is heated for 30 minutes on a boiling water bath with continuous passage of a gentle stream of nitrogen. Then the acetic acid is distilled off under vacuum at 40° C. bath temperature. After a concentrate of about 0.25 part by volume has been obtained, 2.5 parts by volume of distilled water are added and the whole evaporated again to about 0.5 part by volume. Dilution with water is then carried out followed by extraction with methylene chloride and the extract is washed three times with 0.5 N-sodium bicarbonate solution and 6 times with water. The methylene chloride solution which has been dried with sodium sulfate, yields on evaporation under vacuum about 6.7 parts by weight of the (18→11β)-lactone of d:l-Δ⁴-3:20-diketo-11β-hydroxy-pregnene-18-acid, which after recrystallization from methylene chloride-ether melts at 218–220° C.

*Example 3*

0.250 part of the lactone of 1β:2α-di-(formylmethyl)-2β-carboxy-4bβ-methyl-7-ethylene - dioxy - 1:2:3:4:4aα:4b:5:6:7:8:10:10aβ - dodecahydrophenanthrene - 4β-ol is dissolved in 30 parts by volume of benzene, mixed with 0.06 part by volume of glacial acetic acid and 0.04 part by volume of piperidine and boiled for an hour in an atmosphere of nitrogen using a water separator. After cooling, the solution is diluted with ether and washed with water, sodium bicarbonate solution and water, dried and evaporated in vacuo. The crude product is chromatographed over 10 parts of aluminum oxide. From the fractions extracted with mixtures of benzene and ether there is obtained the (18→11β)-lactone of d:l-Δ⁵·¹⁶-3-ethylenedioxy-11β-hydroxy-17-formyl-androstadiene - 18-acid.

This compound can be further converted as follows:

By hydrogenation with a palladium-calcium carbonate catalyst in alcoholic solution according to the method described in Example 2 there is obtained in good yield the corresponding compound saturated in 16:17-position.

If this lactone is first boiled for about 30 minutes with a little concentrated hydrochloric acid in acetone, there is obtained, after working up in the usual manner, the (18→11β)-lactone of d:l-Δ⁴-3-oxo-11β-hydroxy-17-formyl-androstene-18-acid.

0.037 part of this substance is dissolved in 8 parts by volume of glacial acetic acid and mixed with a solution of 0.04 part of sodium dichromate in a mixture of 0.1 part by volume of water and 5 parts by volume of glacial acetic acid and allowed to stand for 12 hours at room temperature. Water is then added and the solution diluted with a mixture of chloroform and ether and separated in the usual manner by extraction with a solution of sodium carbonate into an acid and a neutral fraction.

The sodium carbonate extracts are acidified and extracted with chloroform. The chloroform extracts are washed with a saturated sodium chloride solution, dried and evaporated, and the residue is esterified in a mixture of ether and methanol with an excess of diazo-methane. The solvents are then removed in vacuo. After being chromatographed over aluminum oxide the crude product yields the $(18 \rightarrow 11\beta)$-lactone of d:l-$\Delta^4$-3-oxo-11$\beta$-hydroxy-etienic acid methyl ester 18-acid, of which the infrared spectrum is identical with that of the ester prepared from aldosterone.

The starting material for the cyclization described above is prepared as follows:

3.07 parts of the $(2\rightarrow 4\beta)$-lactone of the $\Delta^{8a}$-1-ethoxy-ethenyl-2$\alpha$(2′,3′-dihydroxypropyl) - 2$\beta$ - carboxy - 4b$\beta$-methyl - 7:7 - ethylenedioxy - 1:2:3:4:4a$\alpha$:4b:5:6:7:8:10:10a$\beta$-dodecahydrophenanthrene - 1:4$\beta$ - diol (described in Example 7 hereinafter) are dissolved in 45 parts by volume of methanol and 8.8 parts by volume of pyridine and, after admixture with 9.65 parts by volume of a 1-molar aqueous solution of periodic acid the reaction mixture is left at room temperature for one hour. Then there are added 26.5 parts by volume of water and 96.5 parts by volume of a 0.1-molar aqueous solution of sodium bicarbonate. After concentration to a small volume in vacuo at 20–25° C. the residue is extracted with a mixture of ether and methylene chloride (3:1) and the extract is thoroughly washed with water, dried and evaporated. From the residue there is obtained by crystallization with ether the $(2\rightarrow 4\beta)$-lactone of the $\Delta^{8a}$-1-ethoxy - ethenyl - 2$\alpha$ - formylmethyl - 2$\beta$ - carboxy - 4b$\beta$-methyl - 7:7 - ethylene - dioxy-1:2:3:4:4a$\alpha$:4b:5:6:7:8:10:10a$\beta$-dodecahydrophenanthrene-1:4$\beta$-diol in colorless crystals.

A solution of 4.46 parts of the above compound in a mixture of 50 parts by volume of chloroform and 2.0 parts by volume of pyridine is mixed at 0° C. with 50 parts by volume of chloroform solution which is 0.5-molar with respect to phosphorus tribromide and 2-molar with respect to pyridine, and the reaction mixture is stirred in an atmosphere of nitrogen for 4 hours at 0° C. Then the mixture is poured on to 375 parts by volume of a 1-molar solution of sodium bicarbonate and ice and extracted with a chloroform-ether mixture (1:3). The extracts are washed with dilute phosphoric acid and sodium bicarbonate solutions and with water, dried and evaporated. The residue is recrystallized from a mixture of acetone and ether, whereby the $(2\rightarrow 4\beta)$-lactone of the $\Delta^{8a}$-1:1 - formylmethylene - 2$\alpha$ - formylmethyl - 2$\beta$ - carboxy - 4b$\beta$ - methyl - 7:7 - ethylenedioxy - 1:2:3:4:4a$\alpha$:4b:5:6:7:8:10:10a$\beta$ - dodecahydrophenanthrene - 4$\beta$ - ol separates in nice crystals.

2.0 parts of the above compound are hydrogenated in 400 parts by volume of ethanol in the presence of 1.0 part of a 10 percent palladium or calcium carbonate catalyst at room temperature and under atmospheric pressure. After the uptake of about 0.8 molar equivalent of hydrogen no more gas is absorbed and the reaction mixture is filtered and the filtrate evaporated under reduced pressure. The residue obtained, which consists of the $(2\rightarrow 4\beta)$-lactone of the $\Delta^{8a}$-1:2$\alpha$-di-formylmethyl - 2$\beta$-carboxy - 4b$\beta$ - methyl - 7:7 - ethylene - dioxy - 1:2:3:4:4a$\alpha$:4b:5:6:7:8:10:10a$\beta$ - dodecahydrophenanthrene - 4$\beta$-ol is used directly for the cyclization as described at the beginning of this example.

Example 4

0.2 part by weight of $(2\rightarrow 4\beta)$-lactone of $\Delta^{8a}$-1:1-formylmethylene - 2$\alpha$(2′ - oxo - 3′ - acetoxy - propyl) - 2$\beta$-carboxy - 4b$\beta$ - methyl - 7 - ethylenedioxy - 1:2:3:4:4a$\alpha$:4b:5:6:7:8:10:10a$\beta$ - dodecahydrophenanthrene - 4$\beta$ - ol is dissolved in 8.5 parts by volume of $\alpha$-pyrrolidone and washed with 8.5 parts by volume of tetrahydrofurane on to 0.1 part by weight of palladium on carbon (10%) and hydrogenated at 25° C. under 760 mm. pressure of mercury. The hydrogenation ceases after 65 minutes when 9.5 parts by volume of hydrogen have been taken up. The hydrogenation solution is suction-filtered through a layer of kieselguhr (Hyflo-Supercel) on a filter and the clear filtrate is diluted with about 100 parts by volume of chloroform-ether (1:3) and the solution extracted 6 times with 8 parts by volume of water each time. The chloroform-ether solutions dried over sodium sulfate and evaporated under reduced pressure give 0.222 part by weight of residue which is dissolved in 11 parts by volume of xylene and boiled under reflux with 0.22 part by volume of triethylamine and 0.11 part by volume of glacial acetic acid in an atmosphere of nitrogen for 7 hours. After cooling, the mixture is diluted with chloroform-ether and washed with 8 parts by volume each of ice-water (twice), 0.5 N-sodium carbonate solution with the addition of ice (4 times), 0.6-m phosphoric acid with the addition of ice (five times) and water (three times). The chloroform-ether solutions are dried over sodium sulfate and evaporated under reduced pressure. The residue is dissolved in 25 parts by volume of benzene, mixed with 0.3 part by volume of pyridine and 0.3 part by volume of acetic anhydride and allowed to stand for 14 hours at 20° C. The mixture is then diluted with chloroform-ether and washed neutral as described above. The residue is chromatographed over 4.5 parts by weight of silicagel. The fractions (0.064 part by weight) eluated with benzene-ether (80:20) benzene-ether (65:35) and bnezene-ether (50:50) are distributed on Whatman No. 1 paper. Partition chromatography is carried out in the system benzene-cyclohexane (1:1) as mobile phase and formamide as stationary phase (development with blue tetrazolium). The zones with $R_F$ 0.25–0.30 are cut out and eluated with methanol-water (50:50), methanol-water (130:30), methanol and chloroform. The eluates concentrated under reduced pressure are extracted six times with 100 parts by volume of chloroform each time and the chloroform solutions washed with 10 parts by volume each of 10% potassium hydrogen carbonate solution and water, dried over sodium sulfate and evaporated under reduced pressure. The residue (0.0085 part by weight) is chromatographed over 0.45 part by weight of silicagel. From the fractions eluated with benzene-ether (80:20) and benzene-ether (50:50) 0.003 part by weight of crystals melting at 153–159° C. is obtained. The latter are recrystallized from a mixture of acetone, ether and pentane. They form stick shapes melting at 159–161° C.; $\lambda$ max. 240 m$\mu$ log $\epsilon$=3.74 in alcohol. The product is the $(18\rightarrow 11\beta)$-lactone of d:l-$\Delta^{5\cdot 16}$-3-ethylene-dioxy-11$\beta$-hydroxy-21-acetoxy-20-oxo-pregnadiene-18-acid.

This compound on hydrogenation in alcoholic solution with a palladium on calcium carbonate catalyst and isolation of the product in the usual way gives the $(18\rightarrow 11\beta)$-lactone of the d:l-$\Delta^5$-3-ethylenedioxy-11$\beta$-hydroxy-21-acetoxy-20-oxo-pregnene-18-acid which can be recrystallized from acetone and melts at 231–233° C.

This substance is identical with the compound described in our copending application Serial No. 770,015, filed October 28, 1958, prepared from the $(18\rightarrow 11\beta)$-lactone of d:l-$\Delta^5$-3-ethylenedioxy-11$\beta$-hydroxy-20-oxo-pregnene-18-acid described in Examples 1 and 2 herein.

Example 5

The starting material for the cyclization described in Examples 1 and 2 may also be prepared as follows:

To a solution of ethyl magnesium bromide prepared from 2.432 parts of magnesium and 9.820 parts of ethyl bromide in 110 parts by volume of anhydrous ether there are added at 12–15° C. internal temperature in the course of 30 minutes 7.88 parts of freshly distilled ethoxy acetylene in 51.5 parts by volume of anhydrous ether. When ethane ceases to evolve, the mixture is stirred for 15 minutes with ice water cooling, the two-phase system homogenized by the addition of 110 parts by volume of benzene and a solution of 7.115 parts of the (2→4β)-lactone of 2α-methallyl-2β-carboxy-4bβ-methyl-7-ethylene - dioxy - 1:2:3:4:4aα:4b:5:6:7:8:10:10aβ-dodecahydrophenanthrene-4β-ol-1-one described in our copending application Serial No. 585,167, filed May 16, 1956 in 80 parts by volume of benzene is added dropwise in the course of 15 minutes at 0–3° C. The mixture is stirred for 3 hours at 0–3° C., ice and saturated ammonium chloride solution are then added; the ether and benzene layer is washed with ammonium chloride solution and with water, dried with sodium sulfate, filtered and evaporated under reduced pressure. The residue is dissolved in ether and filtered through a layer of activated carbon to remove the color. On concentrating there is obtained the (2→4β)-lactone of 1-ethoxy-ethinyl-2α-methallyl-2β-carboxy - 4bβ-methyl-7-ethylenedioxy-1:2:3:4:4:aα:4b: 5:6:7:8:10:10aβ: - dodecahydrophenanthrene-1:4β-diol melting at 138–140° C. A second crystalline modification of the same substance has a melting point of 142–143° C.

A solution of 221.3 parts of (2→4β)-lactone of 1-ethoxy - ethinyl - 2α-methallyl-2β-carboxy-4bβ-methyl-7-ethylenedioxy - 1:2:3:4:4aα:4b:5:6:7:8:10:10aβ-dodecahydrophenanthrene-1:4β-diol in 6500 parts by volume of anhydrous pyridine is agitated in the presence of 100 parts of a palladium calcium carbonate catalyst of 10 percent strength at room temperature in an atmosphere of hydrogen. After taking up gas equivalent to 1 mol, hydrogenation is practically complete. The whole is filtered through a layer of filter aid from the catalyst, rinsed with pyridine and the filtrate evaporated completely in vacuo. The crystalline residue is dissolved in ether, filtered through a layer of activated carbon for the purpose of purification, and the filtrate after being concentrated to a small volume is cautiously mixed with petroleum ether. From this solution there crystallizes the (2→4β)-lactone of 1 - ethoxy-vinyl-2α-methallyl-2β-carboxy-4bβ-methyl-7 - ethylenedioxy-1:2:3:4:4aα:5:6:7:8:10:10aβ-dodecahydrophenanthrene-1:4β-diol with the double melting point 108.5–110° C. and 136–137.5° C. A second modification of the same substance has melting point at 138–139° C.

To a solution prepared in a dry atmosphere of nitrogen of 4.45 parts of (2→4β)-lactone of 1-ethoxy-vinyl-2α-methallyl - 2β - carboxy-4bβ-methyl-7-ethylene-dioxy-1: 2:3:4:4aα:4b:5:6:7:8:10:10aβ - dodecahydrophenanthrene-1:4β-diol in 200 parts by volume of anhydrous pyridine there are added dropwise at 0–3° C. in the course of 5 minutes 55 parts by volume of a 2-molar solution of purest thionyl chloride in anhydrous pyridine. The mixture is stirred at 0–3° C. for a further 15 minutes and then poured on to a mixture of 1000 parts by volume of 1-molar ammonium bicarbonate solution and 100 parts of ice and the reaction vessel is rinsed with 1250 parts by volume of ether. After thorough agitation, the ethereal solution is further washed with ice cold 1-molar ammonium bicarbonate solution and ice water, dried with sodium sulfate and the ethereal solution filtered off from the drying agent is evaporated in vacuo. By recrystallization of the residue from ether there is obtained the (2→4β)-lactone of 1:1-formyl-methylene-2α-methallyl-2β - carboxy - 4bβ-methyl-7-ethylene-dioxy-1:2:3:4:4aα: 4b:5:6:7:8:10:10aβ - dodecahydrophenanthrene - 4β-ol melting at 188–190° C.

A solution of 39.85 parts of the (2→4β)-lactone of 1:1-formyl-methylene-2α-methal'yl-2β-carboxy-4bβ - methyl-7 - ethylene - dioxy-1:2:3:4:4aα:4b:5:6:7:8:10:10aβ-dodecahydrophenanthrene-4β-ol in 1000 parts by volume of anhydrous ethanol is agitated in the presence of 10 parts of a 2.5% palladium strontium carbonate catalyst at room temperature in an atmosphere of hydrogen. After 0.95 molecular equivalent of hydrogen has been absorbed, the whole is filtered with suction from the catalyst and the filtrate is evaporated in vacuo. The resulting mixture is fractionated by distribution chromatography on cellulose in the 80% aqueous methanol/heptane system. From the weakly polar portions having a highly reducing effect on silver diammine solution there is obtained by recrystallization from ether and ether-petroleum ether the pure (2→4β)-lactone of 1β-formyl-methyl-2α-methallyl-2β-carboxy - 4bβ - methyl-7-ethylene-dioxy-1:2:3:4:4aα: 4b:5:6:7:8:10:10aβ-dodecahydrophenanthrene-4β-ol.

To 4.005 parts of (2→4β)-lactone of 1β-formyl methyl-2α-methallyl-2β-carboxy-4bβ-methyl - 7 - ethylenedioxy-1:2:3:4:4aα:4b:5:6:7:8:10:10aβ - dodecahydrophenanthrene-4β-ol in 50 parts by volume of benzene there are added 2.670 parts of osmium tetroxide and the mixture is stirred for 3 hours in an atmosphere of nitrogen. 350 parts by volume of methanol are then added and a solution of 6.30 parts of sodium sulfite in 100 parts by volume of water, the mixture is agitated for 20 minutes in an atmosphere of nitrogen and filtered through a layer of filter aid from the solid reduction products. The filtrate is freed from the organic solvents in vacuo, and the aqueous suspension extracted with methylene chloride. The extract washed with ice-cold 1 N-sodium carbonate solution and water and dried with sodium sulfate leaves on evaporation a practically completely crystalline residue behind. The hydroxylation product thus obtained is dissolved in 89.0 parts by volume of methanol and 1.0 part by volume of pyridine, and a solution of 3.400 parts of periodic acid in 10.0 parts by volume of water is added. After stirring for an hour at room temperature in an atmosphere of nitrogen, the solution is diluted with water and extracted with a mixture of ether and methylene chloride (3:1). The extract washed with water and dried with sodium sulfate leaves on evaporation in vacuo the crude (2→4β)-lactone of 1β-formyl-methyl-2α-acetonyl-2β-carboxy-4bβ-methyl-7-ethylenedioxy - 1:2:3:4:4aα:5: 6:7:8:10:10aβ-dodecahydrophenanthrene-4β - ol behind. It is advantageous to subject the product to ring-closure in the manner described in Example 2 without previous purification.

*Example 6*

The starting material used for the cyclization described in Example 3 may also be prepared as follows:

0.306 part of ethyl bromide in 10 parts by volume of absolute ether (distilled over phosphorus pentoxide) is slowly added with exclusion of moisture to 0.068 part of activated magnesium turnings. When the reaction is complete 1 part of ethoxy acetylene in 20 parts by volume of benzene is added dropwise with agitation in the course of 10 minutes and then agitated for another hour. A solution of 0.5 part of the (2→4β)-lactone of 2β-carboxy-2α-allyl-4bβ-methyl-7-ethylenedioxy - 1:2:3:4:4aα:4b:5: 6:7:10:10aβ-dodecahydrophanthrene-4β-ol-1-one melting at 185–189° C. in 20 parts by volume of benzene is then added to the reaction mass and the whole is allowed to stand for 4 hours at about 20° C. It is then poured on to ice and extracted with ether. The emulsions are broken down with a saturated solution of ammonium chloride. The ethereal solution is washed with water, dried over sodium sulfate and evaporated. The resulting crude product (0.65 part) is chromatographed on 16 parts of aluminum oxide. The fraction eluated with benzene yields 0.14 part of starting material. From the portions extracted with mixtures of benzene and ether with up to 50% ether content there is obtained by crystallization from a mixture of ether and petroleum ether 0.265 part of (2→4β)-lactone of 1-ethoxy-ethinyl-2α-allyl-2β-carboxy-4bβ-methyl - 7 - ethylenedioxy-1:2:3:4:4aα:4b:5:6: 7:8:10:10aβ-dodecahydrophenanthrene-1:4β-diol in thick platelets melting at 149–152° C.

The further fractions (0.057 part) eluated with mixtures of benzene and ether and pure ether yield from ether the compound epimeric at carbon atom 1 in colorless prisms melting at 180–182° C.

0.099 part of the above described ethoxy-ethinyl compound melting at 149–152° C. is agitated in 2 parts by volume of absolute alcohol and 0.5 part of purest pyridine with 0.060 part of a 2% palladium calcium catalyst in an atmosphere of hydrogen. The reaction begins after 5 minutes and is completed in 12 minutes. 8 parts by volume of hydrogen are absorbed. The reaction mixture is filtered, diluted with ether and washed with water. The solution dried over sodium sulfate and evaporated yields 0.099 part of residue from which by crystallization from a mixture of ether and petroleum ether 0.075 part of the (2→4β)-lactone of 1-ethoxy-vinyl-2α-allyl - 2β - carboxy-4bβ-methyl - 7 - ethylenedioxy-1:2:3:4:4aα:4b:5:6:7:8: 10:10aβ-dodecahydrophenanthrene-1:4β-diol is isolated in colorless prisms melting at 120–122° C.

0.094 part of this compound is dissolved in 6 parts by volume of dioxane, mixed with 1 part by volume of water and 0.8 part by volume of 0.2 N-sulfuric acid and allowed to stand for 16 hours at about 20° C. The mixture is diluted with ether, washed with water, potassium bicarbonate solution and water. The ethereal solution is dried and evaporated. The residue (0.092 part) when crystallized from a mixture of ether and petroleum ether yields 0.073 part of starting material which is again allowed to stand for 3 days with dilute sulfuric acid in aqueous dioxane at 20° C. Working up yields 0.069 part of crude product from which 0.021 part of starting material can be recovered.

The mother liquors of both batches are chromatographed over 3 parts of aluminum oxide free from alkali. From the fractions extracted with mixtures of benzene and petroleum ether there is obtained another 0.03 part of starting material, whilst from the fractions eluated with benzene and mixtures of ether and benzene up to 50% ether content there is obtained by crystallization from a mixture of acetone and petroleum ether 0.014 part of the (2→4β)-lactone of 1:1-formyl-methylene-2α-allyl-2β-carboxy-4bβ-methyl - 7 - ethylenedioxy-1:2:3:4:4aα: 4b:5:6:7:8:10:10aβ - dodecahydrophenanthrene-4β-ol in the form of flat needles melting at 162–164° C. The infrared spectrum of this compound pressed in potassium bromide shows the bands of the γ-lactone (5.66μ), of the α:β-unsaturated aldehyde (6.0μ) and of the ketal group (9.1μ).

From the portions eluated with chloroform a small quantity of a compound crystallizing from petroleum ether in colorless needles and melting at 188–192° C. can be isolated.

A solution of 0.40 part of the above described formyl-methylene compound melting at 162–164° C. in 10 parts by volume of rectified alcohol is agitated in the presence of 1 part of 10% palladium calcium carbonate catalyst under hydrogen. After 1.1 molecular equivalents of hydrogen have been taken up, hydrogenation is interrupted. The solution separated by filtration from the catalyst is evaporated to dryness in vacuo and the crude product chromatographed over aluminum oxide. From the fractions having a strong reducing effect on alkaline silver diammine solution there is obtained by crystallization from a mixture of ether and petroleum ether the (2→4β)-lactone of 1β-formyl-methyl-2α-allyl-2β-carboxy-4bβ-methyl-7 - ethylenedioxy - 1:2:3:4:4aα:4b:5:6:7:8:10:10aβ - dodecahydrophenanthrene-4β-ol.

0.502 part of this compound is dissolved in 20 parts by volume of ethyl acetate free from acetic acid and treated with a current of oxygen containing about 3% ozone while stirring vigorously at −60° C. After about 1.5 mols of ozone have been consumed, the supply of ozone is interrupted and nitrogen introduced. The mixture is slowly heated to −10° C., 5 parts by volume of glacial acetic acid are added and then 5.0 parts of zinc dust in portions; the whole is then stirred for another 15 minutes at −10° to 0° C. The mixture is then suction filtered from the unconsumed zinc and the filtrate poured on to 100 parts by volume of ice cold bicarbonate solution. The mixture is thoroughly agitated and the ethyl acetate solution is washed with bicarbonate solution and water, dried and carefully evaporated in vacuo at 25° C. bath temperature. An amorphous residue is obtained which is purified by chromatography over neutral aluminum oxide. From the crystallized fractions having a strong reducing effect on alkaline diammine solution there is obtained the (2→4β)-lactone of 1β:2α-di-(formyl-methyl)-2β-carboxy-4bβ - methyl - 7 - ethylenedioxy - 1:2:3:4:4aα:4b:5:6:7: 8:10:10aβ-dodecahydrophenanthrene-4β-ol.

*Example 7*

The starting material used for the cyclization described in Example 4 is prepared as follows:

0.899 part by weight of the (2→4β)-lactone of Δ⁸ᵃ-1-ethoxy - ethinyl - 2α - allyl - 2β - carboxy - 4bβ - methyl-7 - ethylenedioxy - 1:2:3:4:4aα:4b:5:6:7:8:10:10aβ - dodecahydrophenanthrene-1:4β-diol with melting point 146–148° C. described in Example 6 is dissolved in 2.7 parts by volume of pyridine, diluted with 85 parts by volume of absolute ether and mixed with 0.585 part by weight of osmium tetroxide in 18 parts by volume of absolute ether at 20° C. After allowing the mixture to stand for 130 minutes at 20° C. it is diluted with 90 parts by volume of ether, and then in the course of 10 minutes 270 parts by volume of methanol and then 270 parts by volume of 0.25 N-ammonium sulfite solution in water are run in slowly. After 60 minutes at 20° C. the mixture is suction-filtered through a layer of kieselguhr (Hyflo-Supercel) on a filter, and the clear filtrate is concentrated under reduced pressure at 30° C. bath temperature to 250 parts by volume. The aqueous solution is extracted with a mixture of chloroform and ether; the chloroform-ether are washed twice with a little water, dried over sodium and evaporated under reduced pressure. The residue, 0.935 part by weight, is chromatographed over 28 parts by weight of silicagel. 0.061 part by weight of starting material is recovered from the fractions obtained with the mixture of benzene and ether (80:20). From the fractions eluated with ether-acetone (80:20) and ether-acetone (50:50) 0.168 part of crystals with melting point 149–152° C. is obtained which is the (2→4β)-lactone of Δ⁸ᵃ - 1 - ethoxy - ethinyl - 2α - (2':3' - dihydroxy - propyl) - 2β - carboxy - 4bβ - methyl - 7 - ethylene - dioxy-1:2:3:4:4aα:4b:5:6:7:8:10:10aβ - dodecahydrophenanthrene-1:4β-diol.

0.072 part by weight of the above glycol with melting point 149–152° C. is hydrogenated in 6 parts by volume of a mixture of 1 part by volume of pyridine and 9 parts by volume of alcohol with 0.035 part by weight of a palladium on calcium carbonate catalyst (of 2% strength) at 25° C. and 760 mm. pressure of mercury. The hydrogen uptake ceases within 12 minutes after 3.5 parts by volume (=92% of the calculated quantity) have been taken up. The hydrogenation-solution is suction-filtered through a layer of kieselguhr (Hyflo-Supercel) on a filter and the clear solution evaporated under reduced pressure. The residue is crystallized from a mixture of acetone, ether and pentane and 0.067 part by weight of the (2→4β)-lactone of Δ⁸ᵃ-1-ethoxy-ethenyl-2α-(2':3'-dihydroxy - propyl) - 2β - carboxy - 4bβ - methyl - 7 - ethylenedioxy - 1:2:3:4:4aα:4b:5:6:7:8:10:10aβ - dodecahydrophenanthrene-1,4β-diol with melting point 174–176° C. is obtained.

0.062 part by weight of the above ethoxy-ethenyl derivative is dried for 45 minutes at 60° C. under 0.01 mm. pressure of mercury, mixed with 0.026 part by volume of pyridine and 2.5 parts by volume of a solution of 0.063 part by volume of acetic anhydride in 10 parts by volume of absolute benzene and allowed to stand for 18 hours at 20° C. The acetylation product is washed neutral with 2 N-hydrochloric acid, 2 N-sodium carbonate solution and water and chromatographed over 2 parts by weight of aluminum oxide. From the fractions eluated with chloroform-methanol (95:5) 0.016 part by weight of crystals melting at 148–150.5° C. is obtained which is the (2→4β)-lactone of Δ⁸ᵃ-ethoxy-ethenyl-2α-(2'-hydroxy-3'-acetoxy-propyl) - 2β - carboxy - 4bβ - methyl - 7 - ethylenedioxy-1:2:3:4:4α:4b:5:6:7:8:10:10aβ - dodecahydrophenanthrene-1:4β-diol.

0.027 part by weight of the above acetate is dissolved in 1 part by volume of pyridine and added to 0.06 part by weight of $CrO_3$ part by volume of pyridine. After 16 hours the mixture is worked up. The neutral crude product is chromatographed over 1.5 parts by weight of silicagel. From the fractions eluated with ether and with ether-chloroform (90:10) 0.008 part by weight of hexagonal plates melting at 150–152° C. is obtained which is the (2→4β)-lactone of Δ⁸ᵃ-1-ethoxyethenyl-2α-(2'-oxo-3'-acetoxy - propyl) - 2β - carboxy-4bβ-methyl-7-ethylenedioxy - 1:2:3:4:4α:4b:5:6:7:8:10:10aβ - dodecahydrophenanthrene-1:4β-diol.

From the fraction eluated with ether-chloroform mixtures (90:10, 75:25 and 25:75) 0.006 part by weight of starting material is isolated.

0.15 part by weight of the above ketone melting at 150–152° C. is mixed with 5.0 parts by volume of a solution of 0.14 part by volume of phosphorus tribromide, 0.476 part by volume of pyridine and 19.4 parts by volume of methylene chloride and stirred for 4 hours at 25° C. under nitrogen. Ice and a suspension of 2 parts by weight of sodium hydrogen carbonate in 10 parts by volume of water are then added. The solution is washed neutral with 0.6 N-phosphoric acid, potassium hydrogen carbonate solution of 10 percent strength and water, is dried and evaporated under reduced pressure. There results 0.12 part by weight of a colorless foam which yields from acetone-ether 0.043 part by weight of leaflets melting at 216–222° C, λ max.: 245 mμ, log ε=4.09: 333 mμ log ε=1.76 in dioxane. The resulting product is the (2→4β)-lactone of Δ⁸ᵃ-1:1 - formyl methylene - 2α - (2' - oxo - 3'-acetoxy - propyl) - 2β - carboxy-4bβ-methyl-7-ethylenedioxy - 1:2:3:4:4α:4b:5:6:7:8:10:10aβ - dodecahydrophenanthrene-4β-ol.

Example 8

550 milligrams of potassium hydroxide are introduced into a solution of 200 milligrams of the (18→11)-lactone of d:l - Δ⁵-3-ethylene-dioxy-11β-hydroxy-20-oxo-17-isopregnene-18 acid in 5.0 cc. of dioxane, 25 cc. of methanol and 1.0 cc. of water, and the mixture is stirred for 24 hours at 20–25° C. in an atmosphere of nitrogen. 0.6 cc. of glacial acetic acid is then added to the clear solution and the mixture is extracted with benzene, after being diluted with 3-m solution of sodium chloride. The extract is washed with water, dried with sodium sulfate and evaporated. The residue (205 milligrams) is crystalline and, as shown by paper chromatography of a test portion in the system formamide/cyclohexane-benzene-(1:1), contains in addition to highly polar decomposition products about equal quantities of the 17β-isomer and of the somewhat more weakly polar 17α-isomer. For the purpose of separation the crude product is dissolved in benzene and chromatographed over 20 grams of silica gel ("Davison, Thru 200"). A mixture of benzene and ethyl acetate (9:1) dissolves in the first portions (each of 80 cc.) only traces of impurities. With the same mixture there is next obtained the pure 17α-isomer (fractions 6–10), then mixtures of the 17α- and 17β-isomers (fractions 11–15) and finally almost pure 17β-isomer (fractions 16–19). By recrystallization of the combined fractions 6–10 from a mixture of methylene chloride and ether 40 milligrams of pure starting material can be obtained, which melts at 190–193° C., after evolution of the water of crystallization between 135 and 150° C. and partial conversion. From fractions 16–19 there is obtained by crystallization from a mixture of methylene chloride and ether the pure (18→11)-lactone of d:l-Δ⁵-3-ethylenedioxy-11β-hydroxy-20-oxo-pregnene-18 acid having the double melting point 194.5/207–211.5° C., and exhibiting in methylene chloride an infra-red absorption spectrum showing bands at 5.64μ (γ-lactone-C=O); 5.84μ (ketone-C=O) and 9.08μ (ketal).

The 17-iso-methyl-ketone used as starting material is obtained by treating the corresponding 17β-compound with potassium hydroxide in methanol at room temperature.

Example 9

26.0 milligrams of the 17-iso-methyl-ketone described in Example 1 are dissolved in 1.0 cc. of glacial acetic acid, 1.0 cc. of water is added, and the solution is heated for 30 minutes at 100° C. After being cooled, the reaction mixture is diluted with water and agitated with methylene chloride. The methylene chloride extracts are washed with a 1 N-solution of sodium hydrogen carbonate and with water, dried and evaporated. The residue, on recrystallization form a mixture of methylene chloride and ether, yields 15.0 milligrams of the (18→11)-lactone of d:l-Δ⁴-3:20-dioxo-11β-hydroxy-17-isopregnene-18 acid in the form of colorless lamellae which change into prisms at 185–195° C., and which prisms then melt between 214 and 221° C. From a solution in acetone prisms melting at 224–227° C. separate out directly. In methylene chloride the product exhibits in the infra-red absorption spectrum bands at 5.65μ (γ-lactone-C=O); 5.84μ (isol. ketone-C=O); 5.98μ (conj. ketone-C=O); and 6.17μ (conj. C=C).

By the treatment of this 17-iso-compound in a manner analogous to that described in Example 8 there is obtained a mixture, in which can easily be detected by paper chromatography in the system formamide/cyclohexane-benzene-(1:1) in addition to starting material, the more slowly travelling (18→11)-lactone of d:l-Δ⁴-3:20-dioxo-11β-hydroxy-pregnene-18 acid.

Example 10

3 g. of the (18→11β)-lactone of d:l-Δ⁵·¹⁶-3,3-ethylenedioxy-11β-hydroxy-20-oxo-pregnadiene-18-acid described in Examples 1 and 2 are heated with 30 cc. of glacial acetic acid until all of the substance is in solution, then mixed with 30 cc. of hot water, and placed in a bath of 100° C. for 25 minutes while nitrogen is passed over the mixture. After that, another 30 cc. of hot water are admixed, and crystallization is induced, towards the end at −10° C. The crystals are filtered off and washed with water. In this manner 2.354 g. of (18→11)-lactone of d:l-Δ⁴·¹⁶-3,20-dioxo-11β-hydroxy-pregnadiene-18-acid are obtained which melt and decompose at 240–243° C. ε238 mμ=29200. The IR spectrum taken in methylene chloride solution shows, inter alia, the following characteristic bands: 5.64μ (γ-lactone); 5.98μ (3-ketone+20-ketone); 6.17μ (Δ⁴) and 6.23μ (Δ¹⁶). By working up the aqueous acetic acid mother liquor obtained as described above, another 280 mg. of the aforedescribed lactone can be obtained.

The compound has a pronounced anti-aldosterone effect. Even a small dose thereof suffices to increase considerably the specific sodium elimination in the urine, without attendant increase in the elimination of potassium or water.

What is claimed is:

1. A member selected from the group consisting of a 16,17-saturated and 16,17-unsaturated steroid of the formula

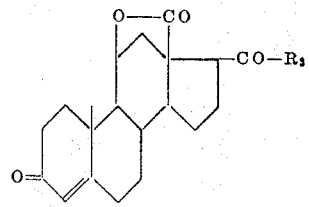

in which $R_3$ is a member selected from the group consisting of hydrogen and a methyl group, and 3-lower alkylene dioxy ketal derivatives of these compounds.

2. The (18→11β)-lactone of the Δ⁴-3,20-dioxo-11β-hydroxy-pregnene-18-acid of the formula

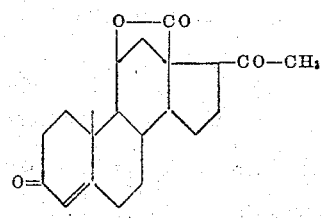

3. The Δ⁵-3-ethylenedioxy-ketal of the compound of claim 2.
4. The (18→11β)-lactone of the Δ⁵·¹⁶-3-ethylenedioxy-11β-hydroxy-20-oxo-pregnadiene-18-acid.
5. The (18→11β)-lactone of the Δ⁵·¹⁶-3-ethylenedioxy-11β-hydroxy-17-formyl-androstadiene-18-acid.
6. The (18→11β)-lactone of the Δ⁵-3-ethylenedioxy-11β-hydroxy-17-formyl-androstene-18-acid.
7. The (18→11β)-lactone of Δ⁴-3-oxo-11β-hydroxy-17-formyl-androstene-18-acid.
8. The compound of the formula

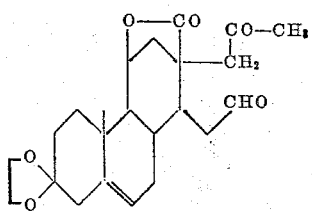

9. The compound of the formula

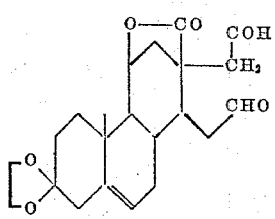

10. The compound of the formula

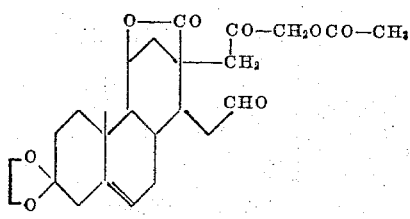

11. Process for the isomerization of 18-oxygenated steroids, wherein a 17-iso-compound of the formula

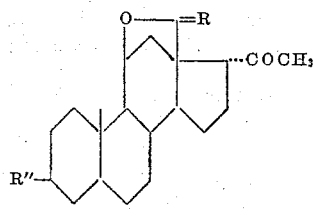

in which R represents a member selected from the group consisting of an oxo group and a hydrogen atom together with a free, an esterified and an etherified hydroxyl group, and R'' a member selected from the group consisting of a free and a ketalized oxo group, and having a double bond starting from the 5-carbon atom, is treated with an alkaline agent, and the resulting compound having a 17β-side chain separated.

12. Process as claimed in claim 11, wherein a member selected from the group consisting of the (18→11)-lactone of Δ⁴-3:20-dioxo-11β-hydroxy-17-iso-pregnene-18-acid and the corresponding 3-ethylene ketal is used as starting material.

13. A member selected from the group consisting of a 17-iso-compound of the formula

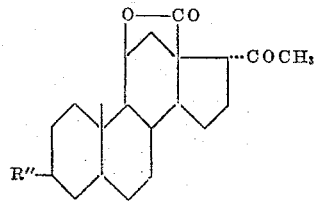

in which R'' represents a member selected from the group consisting of a free and a ketalized oxo group, and in which a double bond extends from the 5-carbon atom.

14. The (18→11)-lactone of Δ⁴-3:20-dioxo-11β-hydroxy-17-iso-pregnene-18-acid.

15. The Δ⁵-3-ethylene ketal of the compound of claim 14.

16. A compound of the formula

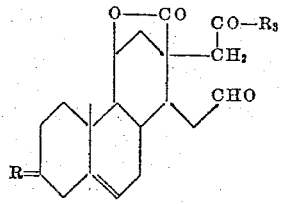

in which R₃ is a member selected from the group consisting of hydrogen, a methyl group, a free hydroxymethyl group, and a hydroxymethyl group esterified by a lower fatty acid, and R represents lower alkylenedioxy.

References Cited in the file of this patent
UNITED STATES PATENTS

| | | |
|---|---|---|
| 2,778,776 | Wettstein et al. | Jan. 22, 1957 |
| 2,852,529 | Poos | Sept. 16, 1958 |
| 2,868,784 | Ruzicka et al. | Jan. 13, 1959 |

UNITED STATES PATENT OFFICE
CERTIFICATE OF CORRECTION

Patent No. 3,014,903             December 26, 1961

Tadeus Reichstein et al.

It is hereby certified that error appears in the above numbered patent requiring correction and that the said Letters Patent should read as corrected below.

Column 2, line 64, for "compounds" read -- compound --; column 3, lines 25 to 33, compound (C), the upper right-hand portion of the formula should appear as shown below instead of as in the patent:

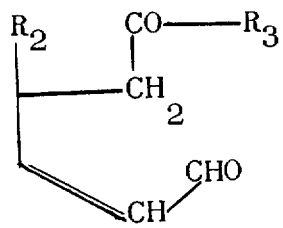

column 3, lines 36 to 45, the upper right-hand portion of the formula should appear as shown below instead of as in the patent:

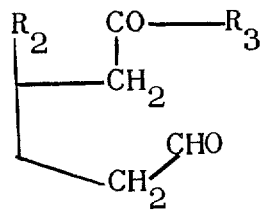

column 4, line 1, for "andüor." read -- and/or --; column 4, after line 48, Formula III, the upper right-hand portion of the formula should appear as shown below instead of as in the patent:

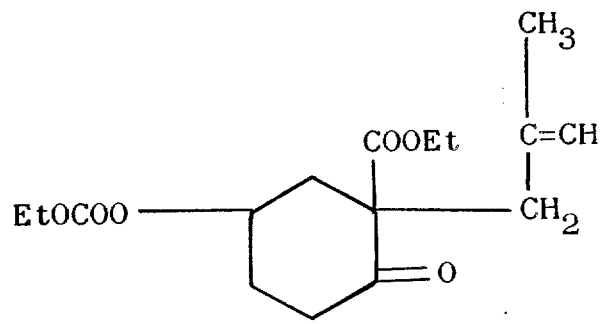

same column 4, between Formula IV and Formula V, for $$\xrightarrow[CrO_2]{Pyridine}$$ read $$\xrightarrow[CrO_3]{Pyridine}$$

column 6, Formula X, the upper right-hand portion of the formula should appear as shown below instead of as in the patent:
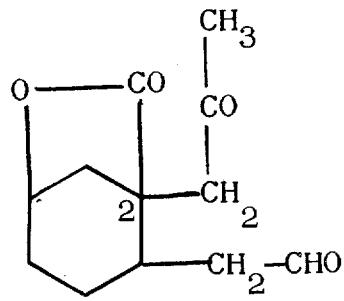
column 5, to the right of Formula XI, the upper right-hand ion should appear as shown below instead of as in the patent:
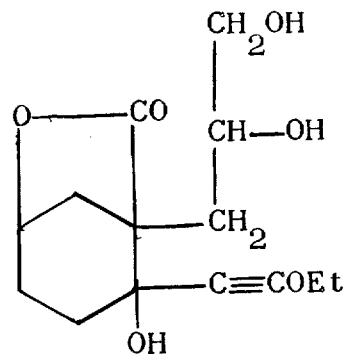
column 6, second formula, to the right of Formula XI, the upper right-hand portion should appear as shown below instead of as in the patent:
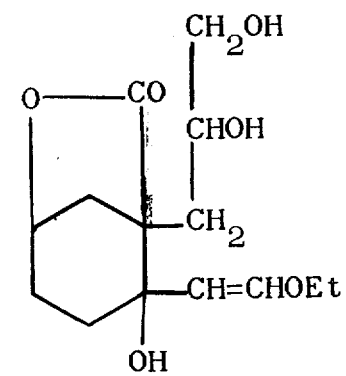

3,014,903 column 5, Formula XII, the upper right-hand portion should appear as shown below instead of as in the patent:

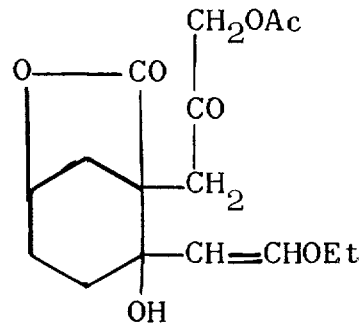

column 7, lines 17 to 26, the lower left-hand portion of the formula should appear as shown below instead of as in the patent:

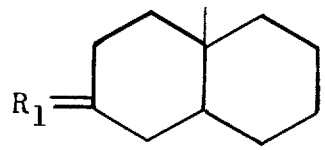

same column 7, line 55, for "carired" read -- carried --; column 8, line 17, for "3:4aα" read -- 3:4:4aα --; column 9, line 46, for "1α-acetonyl" read -- 2α-acetonyl --; column 13, line 19, for "4:4:aα" read -- 4:4aα --.

Signed and sealed this 20th day of November 1962.

(SEAL)
Attest:

ERNEST W. SWIDER
Attesting Officer

DAVID L. LADD
Commissioner of Patents